US012797755B2

(12) United States Patent
Thatcher et al.

(10) Patent No.: US 12,797,755 B2
(45) Date of Patent: Nov. 17, 2026

(54) APPARATUS FOR MOUNTING A CONTROLLER TO A USER

(71) Applicant: Mi Hiepa Scout Limited, Manchester (GB)

(72) Inventors: Gareth Thatcher, Altrincham (GB); Lorenzo Soruri, Bolton (GB); James Bell, Formby (GB)

(73) Assignee: MI HIEPA SCOUT LIMITED, Manchester (GB)

( * ) Notice: Subject to any disclaimer, the term of this patent is extended or adjusted under 35 U.S.C. 154(b) by 215 days.

(21) Appl. No.: 18/520,354

(22) Filed: Nov. 27, 2023

(65) Prior Publication Data

US 2024/0207746 A1 Jun. 27, 2024

(30) Foreign Application Priority Data

Nov. 25, 2022 (GB) ..................................... 2217709

(51) Int. Cl.
*A63F 13/00* (2014.01)
*A63F 13/98* (2014.01)

(52) U.S. Cl.
CPC ...... *A63F 13/98* (2014.09); *A63F 2300/8082* (2013.01)

(58) Field of Classification Search
None
See application file for complete search history.

(56) References Cited

U.S. PATENT DOCUMENTS 5,235,728 A * 8/1993 Nordberg ............. G08B 3/1058 224/667
5,323,650 A * 6/1994 Fullen ...................... A43B 3/44 600/592
5,697,538 A * 12/1997 Goldenberg ......... G08B 3/1058 224/676
5,755,367 A * 5/1998 Yamada ................. H04B 1/086 224/678
5,764,164 A * 6/1998 Cartabiano ............. G06F 3/014 400/100

(Continued)

FOREIGN PATENT DOCUMENTS

JP 2006136694 A 6/2006
WO 2010068901 A2 6/2010

OTHER PUBLICATIONS

Google search, wearable controllers (Year: 2025).*

(Continued)

*Primary Examiner* — Paul A D'Agostino
(74) *Attorney, Agent, or Firm* — Fredrikson & Byron, P.A.

(57) ABSTRACT

An apparatus for mounting a controller (501) to a user is provided. The apparatus comprises a controller holder (100) configured to, in use, hold a controller (501). The apparatus further comprises a mount unit (103) for receiving the controller holder (100), the mount unit (103) being configured to be attached to the user. The controller holder (100) and mount unit (103) are configured to be attached by a resiliently deformable releasable mechanism wherein the controller holder (100) is held in place at least partially by the restorative force due to the deformation of the releasable mechanism. The apparatus further comprises a strap (401) configured to, in use, attach the mount unit (103) to the user.

25 Claims, 16 Drawing Sheets

(56) References Cited

U.S. PATENT DOCUMENTS 5,829,102 A * 11/1998 Conti ........ H04M 1/04 24/3.12
5,983,458 A * 11/1999 Jackson ........ A45F 5/021 24/3.12
6,149,043 A * 11/2000 Goto ........ G08B 3/1058 24/511
D434,898 S * 12/2000 Jokinen ........ D3/218
6,213,619 B1 * 4/2001 Yu ........ F21V 21/145 362/396
6,264,079 B1 * 7/2001 Skaggs ........ F41C 33/041 D3/222
6,360,928 B1 * 3/2002 Russo ........ A45F 5/00 24/3.2
6,405,910 B1 * 6/2002 Infanti ........ A45F 5/02 224/668
6,443,343 B2 * 9/2002 Kamiya ........ A45F 5/02 224/678
6,889,879 B2 * 5/2005 Rivera ........ A45F 5/02 224/904
7,793,361 B2 * 9/2010 Ishihara ........ A44C 5/14 2/170
8,118,666 B2 * 2/2012 Nicely ........ G07F 17/3244 463/16
8,256,071 B2 * 9/2012 Okuda ........ A45F 5/02 24/517
8,322,586 B2 * 12/2012 Davis ........ B26B 3/06 224/232
8,752,974 B2 * 6/2014 Leibowitz ........ A63B 71/0686 362/109
9,004,329 B2 * 4/2015 Hsieh ........ A44C 5/00 224/221
D735,988 S * 8/2015 Hull ........ D3/229
9,451,817 B2 * 9/2016 Oh ........ H04M 1/04
9,451,821 B1 * 9/2016 Estigoy ........ A45F 3/005
9,515,692 B2 * 12/2016 Smith ........ H04M 1/04
9,568,144 B2 * 2/2017 Pernu ........ F16M 13/00
9,570,249 B1 * 2/2017 Douglas ........ H01H 9/025
9,622,557 B1 * 4/2017 Beavers ........ A45F 5/00
9,693,622 B1 * 7/2017 Hackett ........ H04B 1/385
10,165,851 B1 * 1/2019 Downs ........ A45F 5/021
10,335,693 B1 * 7/2019 McFarlane, Jr. ........ A45F 5/1525
10,439,322 B1 * 10/2019 Miller ........ H01R 13/5219
10,480,711 B1 * 11/2019 Tran ........ A45F 5/02
10,783,748 B1 * 9/2020 Peterson ........ G07F 17/3251
11,071,364 B1 * 7/2021 Fowler ........ A45F 5/00
11,202,963 B2 * 12/2021 Esselstrom ........ A63F 13/92
11,394,215 B1 * 7/2022 Bhagwan ........ G02C 11/10
11,642,599 B2 * 5/2023 Stark ........ A63F 13/24 463/46
11,647,318 B1 * 5/2023 Lim ........ H01R 24/68 381/355
12,362,596 B2 * 7/2025 Barker ........ A61B 5/02438
2002/0152645 A1 10/2002 Darley et al.
2003/0104860 A1 * 6/2003 Cannon ........ G07F 17/3244 463/25
2005/0166373 A1 * 8/2005 Saaski ........ A61B 5/6807 24/712.1
2005/0224672 A1 10/2005 Butt et al.
2005/0227811 A1 * 10/2005 Shum ........ A63B 24/0021 482/1
2006/0068873 A1 * 3/2006 Gomez ........ G07F 17/3244 463/16
2006/0129049 A1 * 6/2006 Sano ........ A61B 5/02233 600/499
2006/0237494 A1 * 10/2006 Fichera ........ A45C 11/002 224/669
2007/0060249 A1 * 3/2007 Gomez ........ G07F 17/32 463/16
2007/0117603 A1 * 5/2007 Seelig ........ G07F 17/3211 463/16
2008/0054039 A1 * 3/2008 Wulff ........ A44C 5/0092 224/267
2008/0108431 A1 * 5/2008 Cuddy ........ G07F 17/3276 463/27
2008/0293478 A1 * 11/2008 Anderson ........ G07F 17/3267 463/25
2009/0020571 A1 * 1/2009 Toman ........ A45F 5/00 211/126.15
2009/0124364 A1 * 5/2009 Cuddy ........ G07F 17/32 463/31
2009/0290329 A1 * 11/2009 Barker ........ F21V 21/145 362/108
2009/0321483 A1 * 12/2009 Froloff ........ A45F 5/00 224/267
2010/0151936 A1 * 6/2010 Luciano, Jr. ........ G07F 17/323 463/25
2011/0132181 A1 * 6/2011 Kockovic ........ G10H 1/34 84/723
2012/0199501 A1 * 8/2012 Le Gette ........ A45F 5/1516 206/45.24
2012/0255978 A1 * 10/2012 Williams ........ A45F 5/00 224/219
2013/0079121 A1 * 3/2013 Luciano, Jr. ........ G07F 17/32 463/25
2013/0116032 A1 * 5/2013 Lutnick ........ G07F 17/3276 463/25
2013/0168429 A1 * 7/2013 Pearce ........ A45F 5/021 224/676
2013/0274011 A1 * 10/2013 Meyer ........ G07F 17/3267 463/31
2014/0018146 A1 * 1/2014 Zielinski ........ G07F 17/3267 463/20
2014/0087855 A1 * 3/2014 Caputo ........ G07F 17/3225 463/26
2014/0087861 A1 * 3/2014 Basallo ........ G07F 17/32 463/29
2014/0302909 A1 * 10/2014 Meyer ........ G07F 17/326 463/20
2015/0038213 A1 * 2/2015 Meyer ........ G07F 17/34 463/20
2015/0190720 A1 * 7/2015 Buller ........ A63F 13/98 463/47
2015/0362824 A1 * 12/2015 Cunningham, III ... F16M 13/04 396/420
2016/0030798 A1 * 2/2016 Boekema ........ A63B 21/023 482/139
2016/0104344 A1 * 4/2016 Meyer ........ G07F 17/3258 463/20
2016/0131343 A1 * 5/2016 Dulasky ........ A45F 5/021 224/578
2016/0183667 A1 * 6/2016 MacColl ........ A45F 5/00 224/222
2016/0211875 A1 * 7/2016 Smith ........ H04M 1/04
2016/0317086 A1 * 11/2016 Smith ........ A61B 5/681
2017/0243451 A1 * 8/2017 Alghooneh ........ G08B 6/00
2017/0264329 A1 * 9/2017 Balmer ........ F16M 11/2021
2018/0010883 A1 * 1/2018 Tedder ........ F41C 33/008
2018/0110299 A1 * 4/2018 Kokkoris ........ A43B 3/101
2018/0264312 A1 * 9/2018 Pompile ........ A63B 21/4049
2018/0316380 A1 * 11/2018 Buffin ........ A45F 5/00
2018/0335843 A1 * 11/2018 Erivantcev ........ A63F 13/211
2019/0104830 A1 * 4/2019 Cortellacci ........ A45F 5/00
2019/0287374 A1 * 9/2019 Harsdorff ........ A61B 5/1117
2019/0298039 A1 * 10/2019 Tedder ........ A45F 3/14
2019/0340886 A1 * 11/2019 Humphrey ........ G07F 17/3293
2020/0005587 A1 * 1/2020 Hartl ........ G07F 17/3213
2020/0074784 A1 * 3/2020 Caputo ........ G07F 17/3213
2020/0074785 A1 * 3/2020 Uss ........ G07F 17/3258
2020/0234541 A1 * 7/2020 Pierer ........ G07F 17/3267
2020/0343745 A1 * 10/2020 Choi ........ H02J 50/10
2020/0367820 A1 * 11/2020 De Araujo ........ G06F 3/017
2020/0380827 A1 * 12/2020 Sanborn ........ G07F 17/3213
2020/0402347 A1 * 12/2020 Pierer ........ G07F 17/34
2021/0169417 A1 * 6/2021 Burton ........ A61B 5/02055
2022/0280877 A1 9/2022 Baez

(56) References Cited

U.S. PATENT DOCUMENTS

2024/0426570 A1 * 12/2024 Sonoda ................. F41C 33/048
2025/0391247 A1 * 12/2025 Jones .................. G07F 17/3267

OTHER PUBLICATIONS

Amazon, "Fyoung Wrist Bands Compatible with Just Dance 2023 2022 2021 2020 Switch & OLED Model Version, 2 Pack Adjustable Elastic Dance Straps Fit for Adult and Children—Black", Amazon.co.uk, [online], Available from: https://www.amazon.co.uk/dp/B08FBT34QZ, Accessed May 24, 2023 See description and figures, earliest review dated Jun. 11, 2020.

* cited by examiner

APPARATUS FOR MOUNTING A CONTROLLER TO A USER

TECHNICAL FIELD

This invention relates to an apparatus for releasably attaching a controller, such as a computer game or virtual reality controller, to a user.

BACKGROUND

Mounting mechanisms for attaching input devices or sensors to a user are known in the art. Such mounting mechanisms allow control input to be provided to a computing device by the user moving the appendage to which the input device is mounted.

For example, it is known to mount a controller to a user's foot, allowing motion of the user's foot to provide input to a computer. This may be done by securing a portion of the device at least partially underneath the user's shoelace, securing by straps or using a tether such as a string to tie the device or sensor to a location on the user. For example, a mount portion can be disposed at least partially underneath the shoelace of a shoe. A housing for a sensor can then be releasably attached to the mount.

SUMMARY OF INVENTION

The inventors of the invention disclosed herein have appreciated the need to improve upon the existing mechanisms for mounting a controller and/or sensor to a user. In particular, the need for a mechanism which is easy to use when the user may have partially or fully obstructed vision, such as when using a virtual reality headset.

The invention is defined in the independent claims. Optional features are set out in the dependent claims.

An apparatus for mounting a controller to a user is provided according to an aspect of the disclosure. The apparatus comprises a controller holder, and a mount unit for receiving the controller holder. The mount unit is configured to be attached to the user. The controller holder and mount unit are configured to be attached by a resiliently deformable releasable mechanism. The controller holder is held in place, at least partially, by the restorative force due to the resilient deformation of the releasable mechanism.

Optionally, the controller holder further comprises a cut-out for permitting resilient deformation of the controller holder when engaging with the mount unit. Such a cut-out permits portions of the controller holder, either side of the cut-out, to be urged towards each other as the controller holder is slid into the mount unit. Once the controller holder is fully inserted into the mount unit, the restorative force from the controller holder's resilient deformation will hold the controller holder in place, at least partially, within the locking mechanism.

Optionally, the cut-out of the controller holder is configured to permit the controller holder to resiliently deform to receive a controller before the controller holder is inserted into the mount unit. The controller holder may also be configured to hold the controller in place within the controller holder when it is inserted into the mount unit. As well as the controller holder being deformable inwards for insertion into the mounting unit, the controller holder cut-out allows portions of the controller holder either side of the cut out to be urged away from each other as a controller is inserted into the controller holder. This means the controller can be easily inserted into the controller holder. Furthermore, as the controller holder is inserted into the mounting unit, the force holding the controller in the controller holder increases to hold the controller securely when the controller holder is fully inserted into the mount unit.

Optionally, the controller holder may further comprise two substantially separated longitudinally extending portions either side of the cut-out which can be urged towards each other, the portions are joined to each side of a pivot location and the distance between the portions increases as the distance from the pivot location increases.

Optionally, the pivot location may be rounded to reduce stress concentrations.

Optionally, the resiliently deformable releasable mechanism comprises guide members for engaging with respective corresponding guide member receiving channels. Guide member receiving channels provide the user with an easy way to guide the controller holder into the mount unit when they may have partially obstructed vision, such as when wearing a virtual reality headset.

Optionally, the guide member receiving channels each comprise a wall extending from the mounting unit for resisting lateral displacement of the guide members.

Optionally, the guide member receiving channels each further comprise an overhang portion for resisting, at least partially, any vertical displacement of the guide members.

Optionally, the guide members are formed of longitudinally extending members.

Optionally, the guide members are on the controller holder and respective corresponding guide member receiving channels are on the mounting unit.

Optionally, the controller holder further comprises a cradle for receiving the controller.

Optionally, the controller holder further comprises a retaining member for, in use, engaging with a control input of a controller and holding the controller within the controller holder and where optionally the control input is a pressable button. The retaining member will provide a retention function for the controller which, in use, will resist any controller displacement.

Optionally, the controller holder further comprises at least one opening for controller sensors and/or cameras of a controller mounted in the controller holder. Having the sensors and/or cameras of the controller unobstructed will improve the experience of the user by improving the performance and feedback of the overall system.

Optionally, the mount unit includes a controller holder channel for slidably receiving the controller holder, wherein the controller holder channel has a first end that is open for receiving the controller holder and a second end towards which the controller holder is slid. The controller holder channel may also narrow between the first and the second end. This tapering of the controller holder channel ensures that the further the controller holder is pushed in to the mount unit, the greater the controller holder resiliently deforms. Thus, the greater the controller holder is retained by virtue of the restorative force of the controller holder material. This mechanism is a simple releasable mechanism which can be easily utilised by all potential users. There is also no need for any tightening of the mechanism throughout use and due to the nature of the resiliently deformable mechanism a user will always have the same experience of the mechanism regardless of the number of uses. It has also been designed as a universal size for all users.

Optionally, the size of the opening at the first end of the controller holder receiving channel is greater than the width of the portion of the controller holder that is received in the controller holder receiving channel. This means that the receiving channels' separable distance at an open end is greater than that of the guide members. The controller holder receiving channel starts off wider than the portion of the controller holder received in it, but becomes narrower than the controller holder such that a force is exerted to compress the controller holder as it is slid into the controller holder receiving channel.

Optionally, the controller holder is pushed into the mount unit in a direction from heel to toe, when the mount unit is mounted on a user's foot. A stop feature prevents the controller holder moving past a certain position once inserted into the mount unit. During use, the forces exerted on the controller holder and controller generally urge the controller holder and controller in the direction of the user's heel to their toe, for example kicking motions. Insertion in the heel to toe direction ensures that the controller holder is more securely held in place during use.

Optionally, the controller holder locks into place at a maximum push distance. This eliminates the risk that the controller holder, and therefore controller, could come free when the apparatus is in use.

Optionally, the resiliently deformable mechanism is configured to be loosened, and the controller holder removed from the mounting unit, by sliding the controller holder in an opposite direction to the direction in which the controller holder is inserted into the mounting unit.

Optionally, the apparatus comprises at least one protrusion for engaging with at least one recess to hold the controller holder partially in place once inserted to the final stop position in the mount unit. Optionally, at least on protrusion is mounted on the controller holder and the at least one recess is mounted on the mounting unit or vice versa.

Optionally, the mount unit further comprises a mount plate which is contoured for a specific body part. This will allow the mount unit to be comfortably attached to the user and worn for extended periods of time.

Optionally, the mount unit can be attached to a user's foot.

Optionally, the controller is a video game controller or a virtual reality controller that is used to provide user control input to a computer running a virtual reality program and outputting display data to a virtual reality headset.

Optionally, the mount unit further comprises at least one slot for an attachment strap for a strap that passes around the underneath of a user's foot. This attachment slot provides an anchor point for the attachment strap.

Optionally, the apparatus further comprises a foot strap that passes around the bottom of a user's foot for attaching the mount unit to the user's foot.

Optionally, the apparatus further comprises an ankle strap for passing around a user's ankle for securing the strap to the user.

Optionally, the strap around a user's ankle is coupled to the strap around a user's foot.

BRIEF DESCRIPTION OF THE DRAWINGS

Embodiments of the invention will be described in more detail by way of example, with reference to the accompanying drawings where.

DETAILED DESCRIPTION OF THE INVENTION

Figure 1:
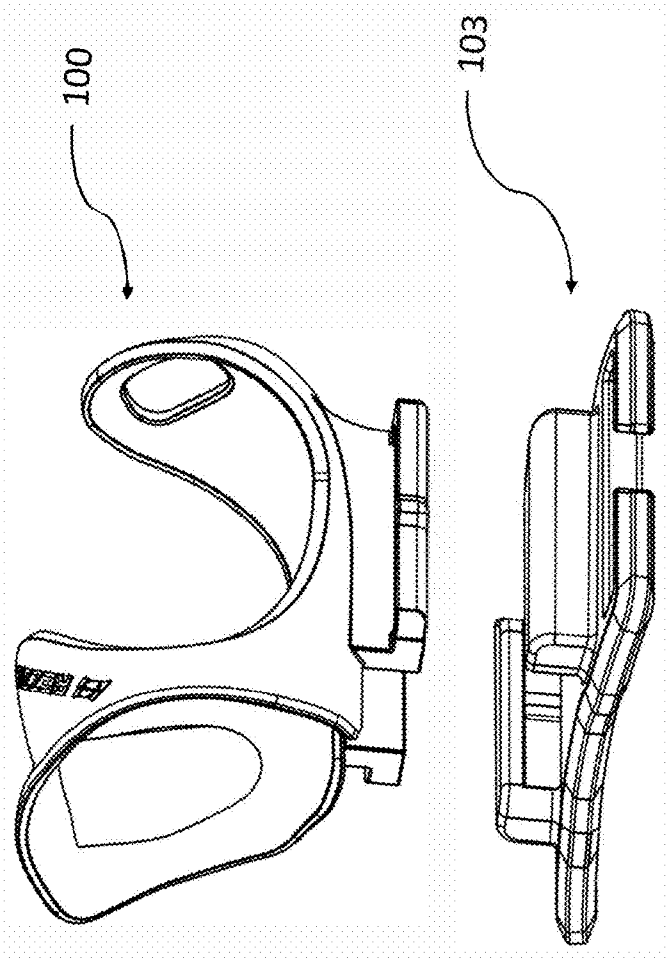
FIG. 1 is a schematic representation of the controller holder and mount unit according to a first embodiment.

FIG. 1 shows an embodiment of the invention. A controller holder (100) and a mount unit (103) are provided. The controller holder (100) receives a controller (501). The mount unit (103) receives and retains the controller holder (100) and is attachable to the user. In particular, in this embodiment, the mount unit (103) is attachable to a user's foot.

Figure 2:
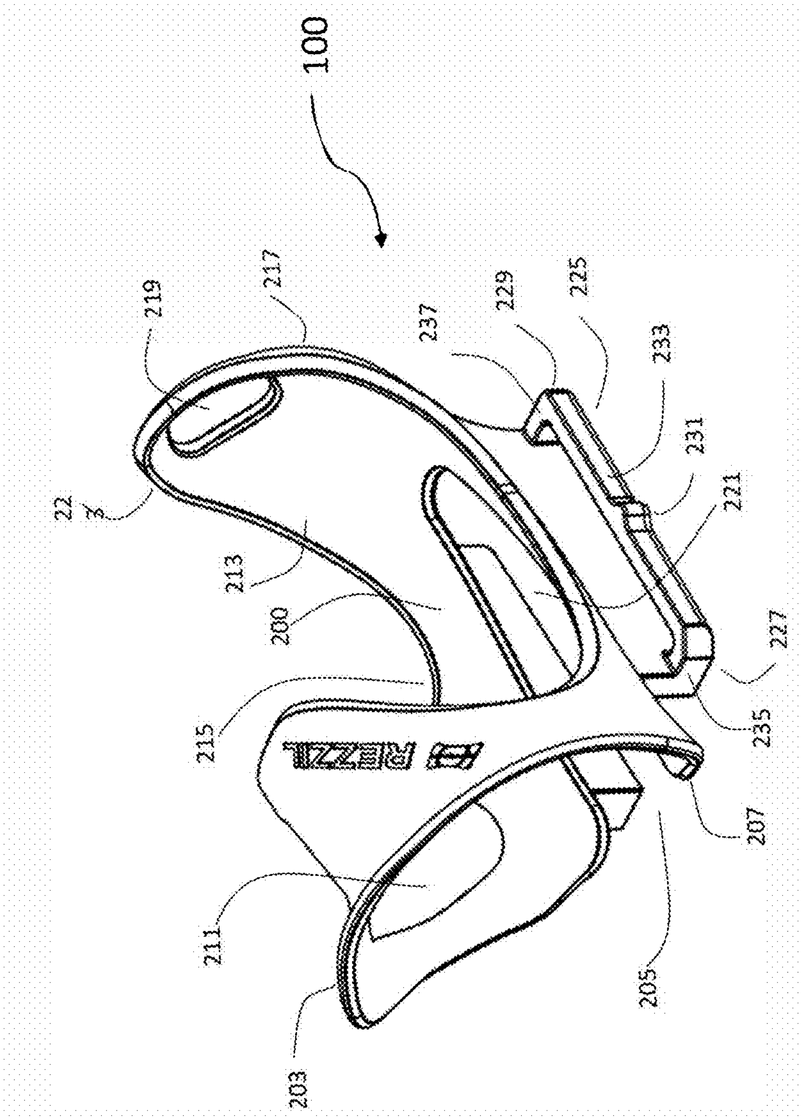
FIG. 2 is a schematic representation of an isometric view of the controller holder according to the first embodiment.

FIG. 2 shows the controller holder (100). The controller holder (100) provides means for holding a controller (501), and in particular, in this example, a virtual reality controller. The controller holder (100) comprises a cradle (200) for holding the controller (501).

The cradle (200) comprises a retaining member (203) for engaging around the controller (501) to hold it in place. The retaining member (203) is located at one end of the controller holder (100) and defines an opening (205) for receiving a controller (501). The retaining member (203) extends around the controller (501) and is shaped to engage with it to hold the controller (501) in place. The retaining member (203) may comprise an arc, band or strap (207) that may circumscribe or encompass a portion of the controller (501) when it is inserted in to the cradle (200).

The retaining member (203) comprises a control input cut-out (211) for engaging with a control input (519) of a controller (501) (e.g. a virtual reality controller) to further hold the controller (501) in place. The control input cut-out (211) is formed as a hole or recess in the retaining member (203). It is located in a corresponding position to receive the control input (519). In this embodiment it is located on one side of the retaining member (203) and in particular may be located on one side of the arc, band or strap (207)

The cradle (200) has a rear portion (213) for supporting the controller (501). The rear portion (213) is connected to the retaining member (203) by side walls (215). The rear portion (213) forms a closed end (217) against which the controller (501) can abut when it is inserted in to the cradle (200). The closed end (217) is contoured to secure the end of the controller handle (505) in place. The closed end (217) may further comprise a strap cut-out (219) for a controller security strap to be fed through.

The cradle (200) has a cut-out (221) shaped to enable the cradle (200) to expand and contract the opening (205) formed by the retaining member (203). In particular, the cut-out (221) extends from the end of the controller holder (100) at which the retaining member (203) is located and is open at that end. The cut out (221) extends along the length of the controller holder (100) towards the rear portion (213). The cut out (221) may extend substantially to the rear portion (213) of the controller holder (100) or a portion of the way to the rear portion (213). In particular, the cut-out (221) may extend from the end of the controller holder (100), along the length, by an amount sufficient to allow the controller holder (100) to resiliently deform such that the controller (501) can be inserted. For example, the cut-out (221) may extend from the end of the controller holder (100), along the length of the controller holder (100), to a position of between 45% to 96% along the length of the controller holder (100). In particular the cut out may extend at least 55% of the length of the controller holder (100), or at least 79% of the length of the controller holder (100).

There exists an open top (223) defined by the perimeter that connects the top edges of the retaining member (203), side walls (215) and closed end (217) together. This open top (223) accommodates various features of the controller (501) when it is inserted into the cradle (200), such as buttons and/or one or more joysticks.

The controller holder (100) includes a mechanism for guiding the controller holder (100) into the mount unit (103). In the present embodiment, a pair of guide members (225) are connected to the underside of the cradle (200). Each guide member (225) may comprise a resiliently deformable beam (233) supported at each end by supports (235, 237) on the controller holder (100). The resiliently deformable beam (233) may further comprise a protrusion (231) for engaging with a recess (319) on the mount unit (103). Each guide member (225) may comprise a chamfer end (227) and optionally a stopper end (229). The stopper end (229) may optionally comprise a stop feature) extending from the one or more of the guide members (225) for engaging with a corresponding guide member receiving channel (313) and stopping the controller holder (100) from being pushed further into the mount unit (103).

As an alternative to the guide member arrangement of FIG. 2, other forms of guide member may be used. For example the guide members may each comprise an arm with a prong end and stopper end. The prong end may comprise a protrusion for interacting with the recess on a corresponding guide member receiving channel (313). The stopper end of the guide member (225) may further comprise a stop feature extending from the arm.

Figure 3A:
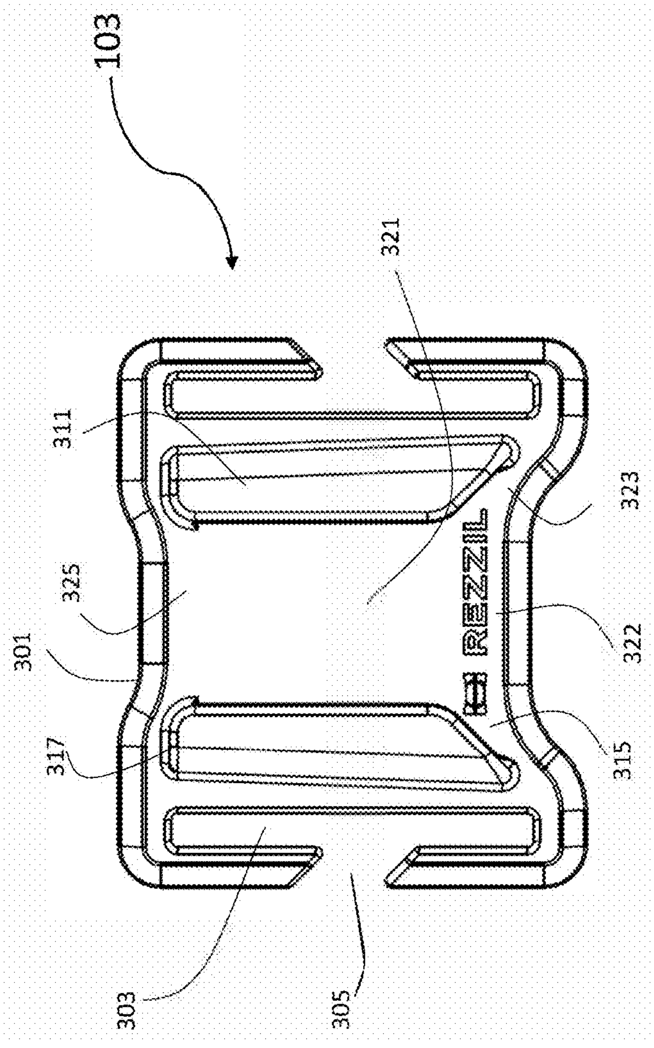
FIG. 3A is one view of a schematic representation of the mount unit according to the first embodiment.
Figure 3B:
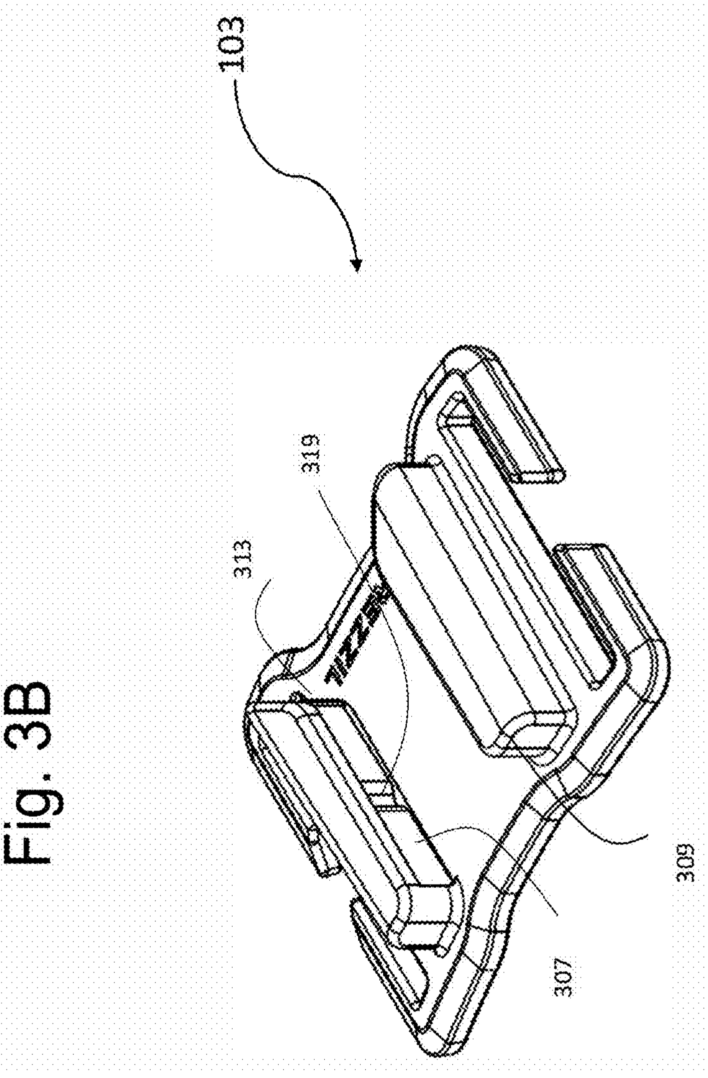
FIG. 3B is another view of the schematic representation of the mount unit according to the first embodiment.

FIGS. 3A and 3B show the mount unit (103). The mount unit (103) comprises a mount plate (301) which is preferably contoured to comfortably fit a user's body part, such as the top of a foot. In particular the mount plate (301) may have a generally concave rounded shape. Attached to each side of the mount plate (301) are retaining means such as slots (303) for connecting an attachment strap (401) such as a foot strap. Optionally the slots (303) have a break (305) to allow for the attachment strap (401) to be removed and attached.

The mount unit (103) includes a mechanism for receiving the controller holder guide members (225) in the form of guide member receiving channels (313). In the present embodiment, the mount unit (103) further comprises walls (307) extending from the mount plate (301). Provided at the top edges (309) of the walls (307) are overhang portions (311). The combination of the mount plate (301), walls (307) and overhang portions (311) defines the guide member receiving channels (313). There exists an open end (315) of each guide member receiving channel (313) for receiving the guide members (225) which, in this embodiment, are attached to the controller holder (100). There also exists a capped end (317) of each guide member receiving channel (313). Optionally a recess (319) is further defined in each of the walls (307) for interacting with the protrusions (231) of the guide members (225). A controller holder channel (321) is defined by the distance between the walls (307) which in this specific embodiment are extending from the mount plate (301). The distance between the walls (307) reduces from the first end (323) to the second (325) end of the controller holder channel (321).

It should be appreciated that whilst in this specific embodiment the guide members (225) are attached to the controller holder (100) and the guide member receiving channels (313) are on the mount unit (103), they can be configured, in other embodiments, to be the other way around.

Figure 4:
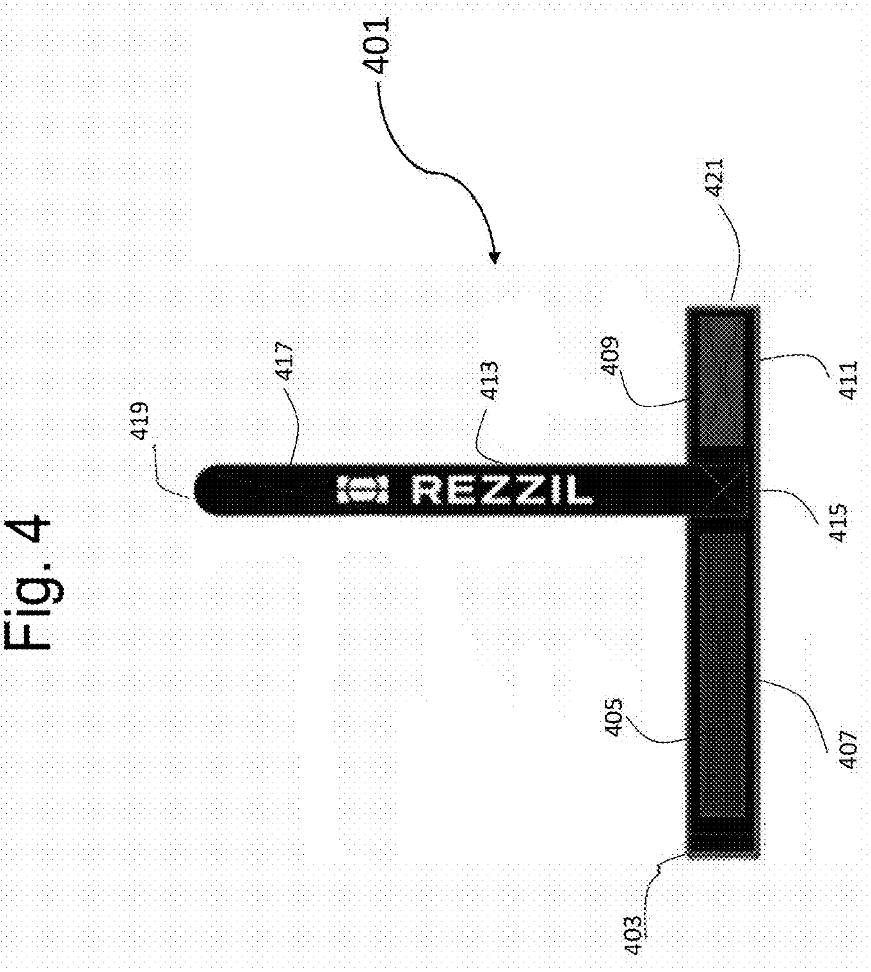
FIG. 4 is a schematic representation of the foot strap and ankle strap according to the first embodiment.

FIG. 4 shows an attachment strap (401) and in this particular example, a foot strap. The strap (401) comprises a closed loop (403) on one end for attaching to one of the slots (303) on the mount unit (103). The attachment strap (401) further comprises attachment means, such as hook and loop attachment means, along the strap (401). In particular, the end of the strap opposite the closed loop (403) may attach to the strap (401) at a position between the ends. As indicated in FIG. 4, loops (405) may be provided on a side of the main body (407) of the strap (401) and hooks (409) may be provided are on a side of a fold back portion (411) of the attachment strap (401). The positioning of the hooks and loops may be reversed. The attachment strap (401) is preferably made from a resiliently deformable material such as neoprene.

In this embodiment the attachment strap (401) further comprises an ankle strap (413) which is attached at a fixed end (415) to the main body (407) of the attachment strap (401). The ankle strap (413) is preferably made from a resiliently deformable material such as neoprene. The ankle strap (413) comprises hooks or loops (417) along a free end (419) for attaching to the loops of hooks (405) on the main body (407) of the attachment strap (401).

In use, the loop (403) of the attachment strap (401) is attached to one of the slots (303) of the mount unit (103), located on the top of the user's foot. The main body (407) of the attachment strap (401) is then pulled around the underneath of the user's foot. The non-loop end (421) opposite the closed loop (403) is fed through the other slot (303) on the mount unit (401). The fold back portion (411) of the attachment strap (401) can then be folded back on itself and pulled tight around the foot, using the slot as an anchoring position. Once the attachment strap (401) is tight enough around the user's foot, the non-loop end (421) of the attachment strap (401) can be attached to the main body (407) of the attachment strap (401) using the hook and loop attachment means discussed above.

The user can then pull the ankle strap (413) around the back of their ankle until it is sufficiently tight. The free end (419) of the ankle strap (413) can then be attached to the main body (407) of the foot strap using hook and loop attachment means discussed above.

Figure 5:
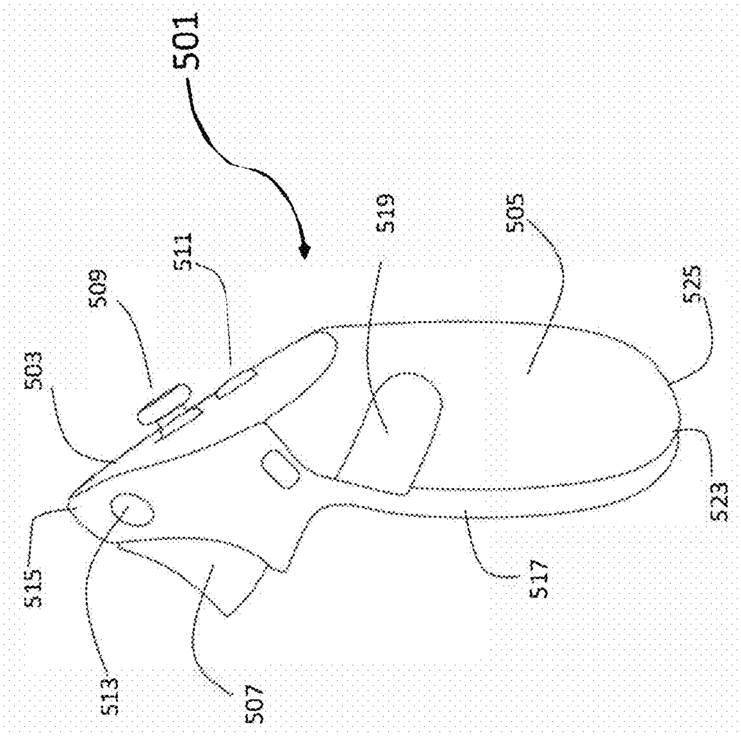
FIG. 5 is a schematic representation of the controller according to the first embodiment.
Figure 6:
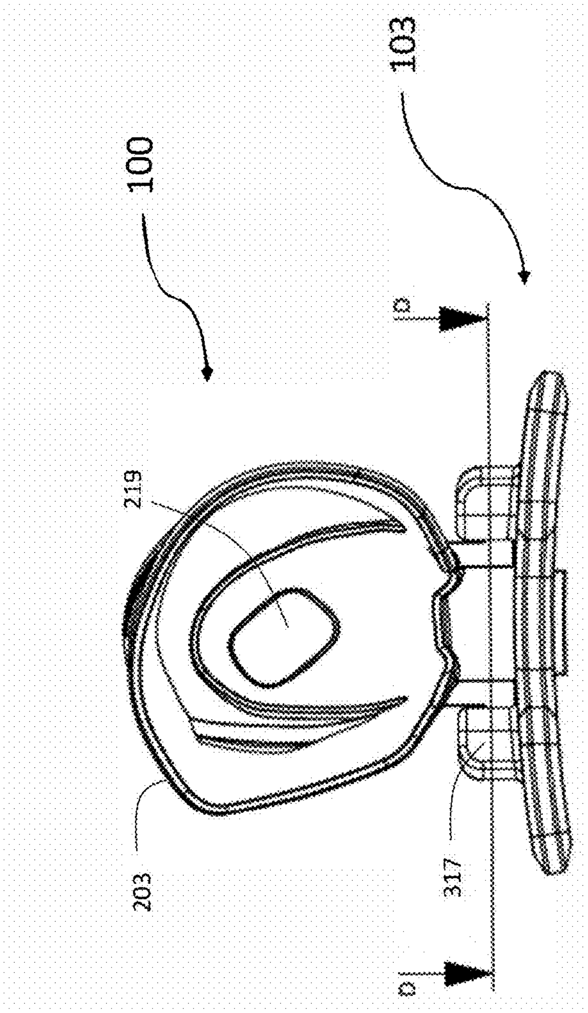
FIG. 6 is a representation of the controller holder and mount unit seen from one end.

FIG. 5 shows an example of a controller (501), which in this particular embodiment is a virtual reality controller. The controller (501) comprises a controller head (503) and a controller handle (505). The controller head (503) comprises a trigger (507) on the front and a thumb stick (509) and buttons (511) on the top. The controller head (503) further comprises a series of cameras and/or sensors (513) along a front edge (515). The controller handle (505) comprises a grip portion (517) and a control input (519). A security strap, for in use being engaged around a user's body part, can be attached to a loop on the end (525) of the controller handle (505).

In order to insert the controller (501) into the controller holder (100), the controller (501) is slid into the cradle (200). The V-shaped cut-out (221) on the controller holder (100) is configured to resiliently deform when receiving the controller (501). In particular, as the controller handle (505) is slid into the open end (205) of the controller holder (100) the V-shaped cut-out (221) allows the cradle (200) to resiliently deform, widening the cut-out (221) to receive the controller handle (505). The controller (501) will be slid into the controller holder (100) until the end (525) of the controller handle (505) abuts against the closed end (217) of the controller holder (100).

As the controller (501) is being slid into the controller holder (100), the control input (519) on the controller handle (505) will engage with the retaining member (203) and be pressed in.

As the controller (501) continues to be pushed into the controller holder (100), the control input (519) will align with the control input cut-out (211) on the retaining member (203) of the controller holder (100). When the control input (519) is aligned with the control input cut-out (211), the control input (519) will return to its non-compressed position and protrude from the control input cut-out (211). The perimeter of the control input cut-out (211) is then engaged around the sides of the controller control input (519), holding the controller in place.

FIGS. 6 to 9B show how the controller holder (100) is mounted to the mount unit (103). For the user to attach the controller holder (100) to the mount unit (103), the user must slide the controller holder (100) into the mount unit (103) such that the guide members (225) align with the controller holder channel (321) and the guide members (225) engage with the guide member receiving channels (313).

Figure 7A:
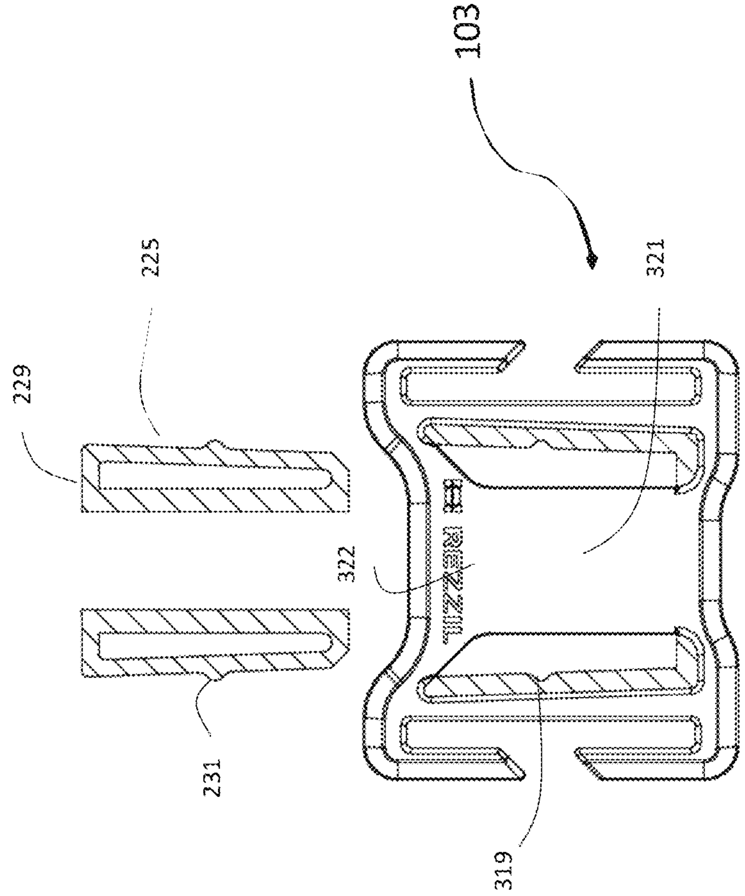
FIG. 7A is a top down schematic representation of the guide members of the controller holder, along the line D-D of FIG. 6, about to engage with the guide member receiving channels of the mount unit, according to the first embodiment.
Figure 7B:
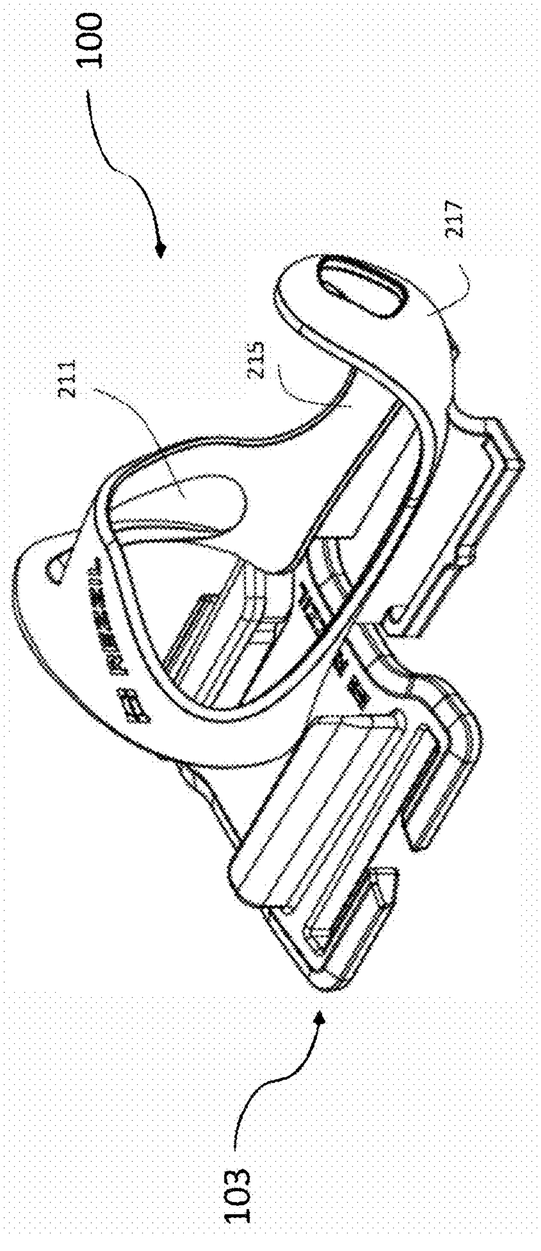
FIG. 7B is a perspective view of the controller holder and mount unit according to FIG. 7A.

FIGS. 7A and 7B show the guide members (225) of the controller holder (100) just before being inserted into the controller holder channel (321) of the mount unit (103). The controller holder channel (321), which is defined in this specific embodiment by the walls (307) extending from the mount plate (301), has an open end (322) which is wider than the width defined by the outer edges of the guide members (225), which in this example are attached to the controller holder (100). A wider distance of the controller holder channel open end as compared to the width defined by the guide members (225) provides the user with a larger tolerance for aligning the guide members (225) with the guide member receiving channels (313) when they may have partially or fully obstructed vision, such as when wearing a virtual reality headset.

Figure 8A:
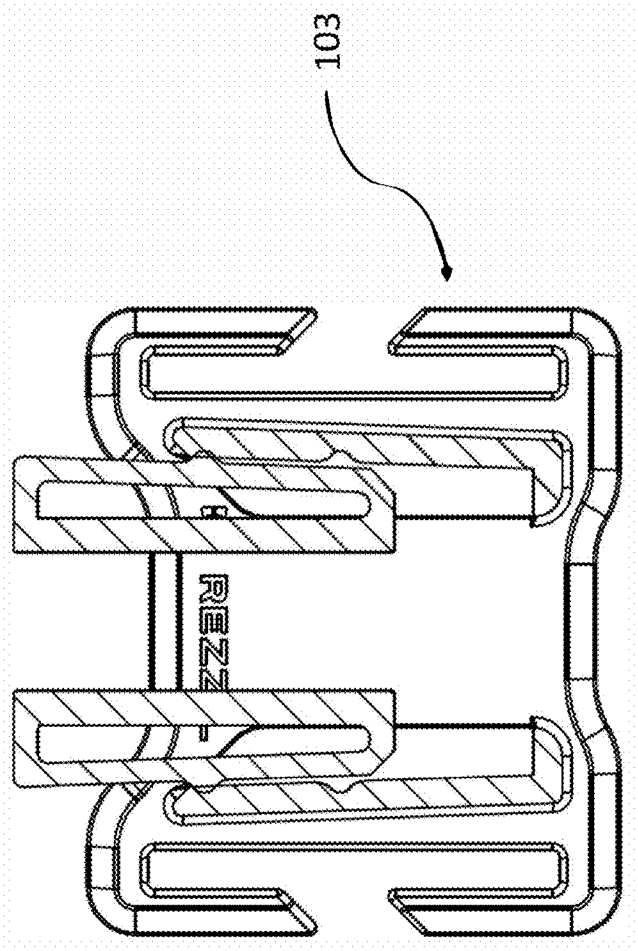
FIG. 8A is a top down schematic representation of the guide members of the controller holder, along the line D-D of FIG. 6, partially engaged with the guide member receiving channels of the mount unit, according to the first embodiment.
Figure 8B:
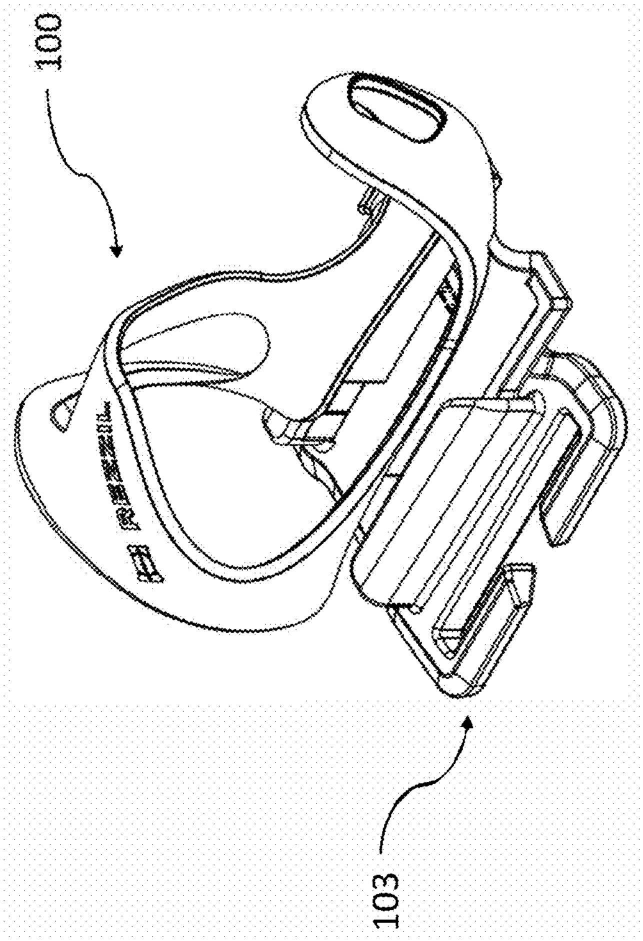
FIG. 8B is a perspective view of the controller holder and mount unit according to FIG. 8A.

FIGS. 8A and 8B show that once the guide members (225) are aligned with the open end (315) of the guide member receiving channels (313), as the user pushes the controller holder (100) into the mount unit (103), the guide members (225) will engage with the guide member receiving channels (313). The arms or beams (233) of the guide members (225) will be in contact with the walls (307) of the guide member receiving channels (313).

The distance between the walls (307) and controller holder channel (321) narrows with increasing distance from the open end (315) of the guide member receiving channels (313). As the controller holder (100) is pushed further into the mount unit (103), this narrowing causes the guide members (225) to be urged together and thus the V-shaped cut-out (221) of the controller holder (100) to resiliently deform inwards. The further the V-shaped cut-out (221) resiliently deforms in this way, the tighter the retaining member (203) engages around the controller (501). In addition, the guide members (225) are resiliently deformed inwards.

Figure 9A:
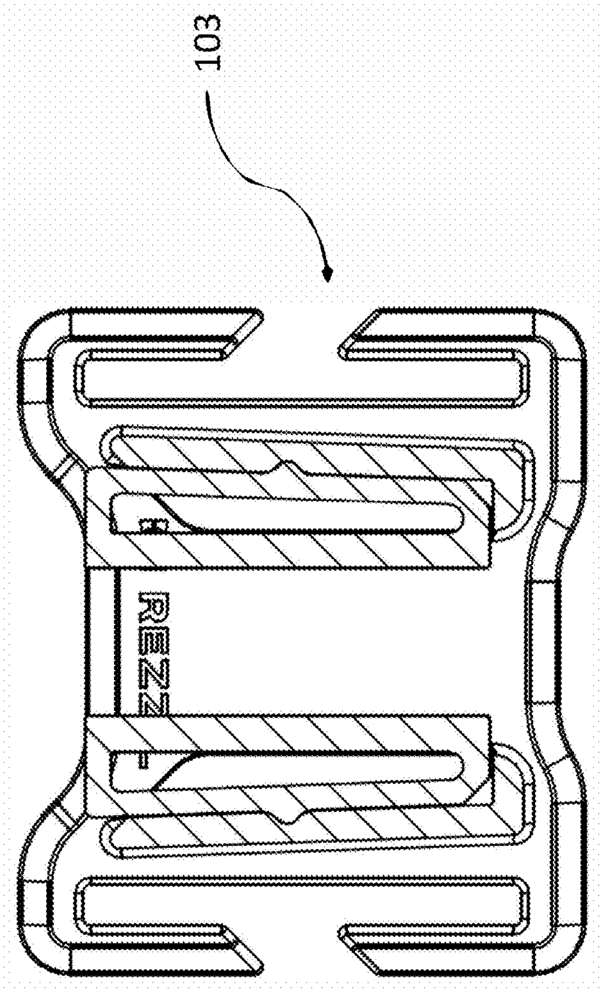
FIG. 9A is a top down schematic representation of the guide members of the controller holder, along the line D-D of FIG. 6, fully engaged with the guide member receiving channels of the mount unit, according to the first embodiment.
Figure 9B:
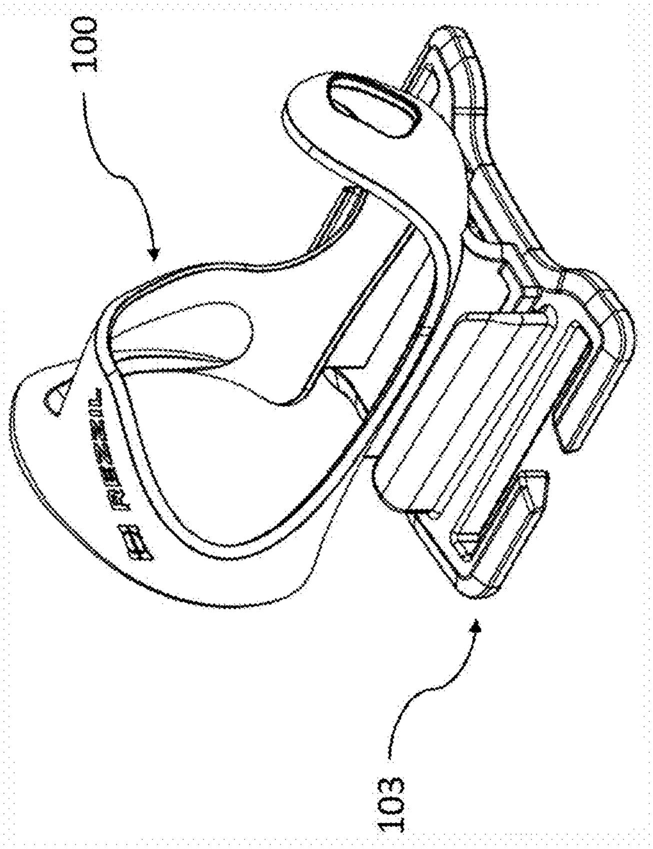
FIG. 9B is a perspective view of the controller holder and mount unit according to FIG. 9B.
Figure 10A:
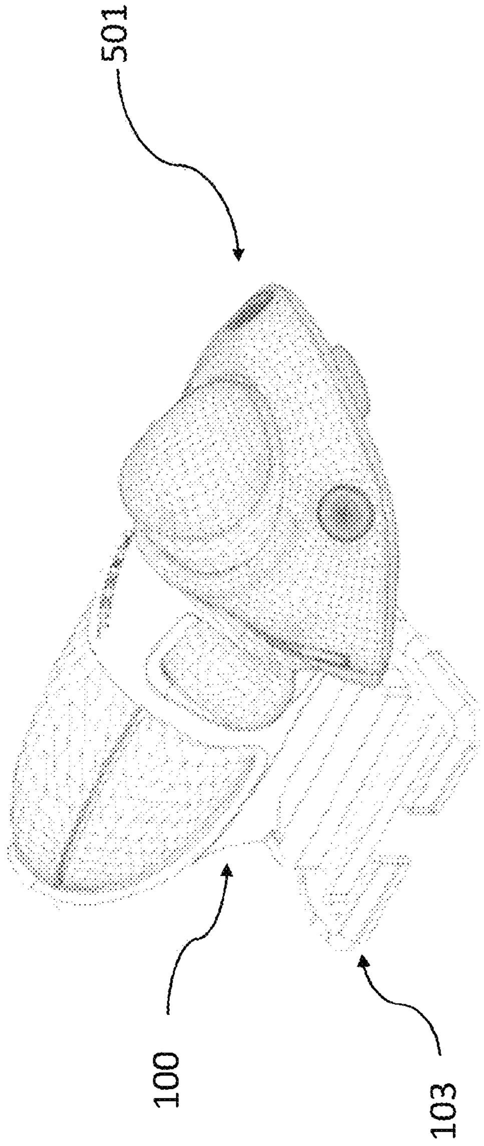
FIG. 10A is one perspective view of the apparatus in a ready to use configuration.
Figure 10B:
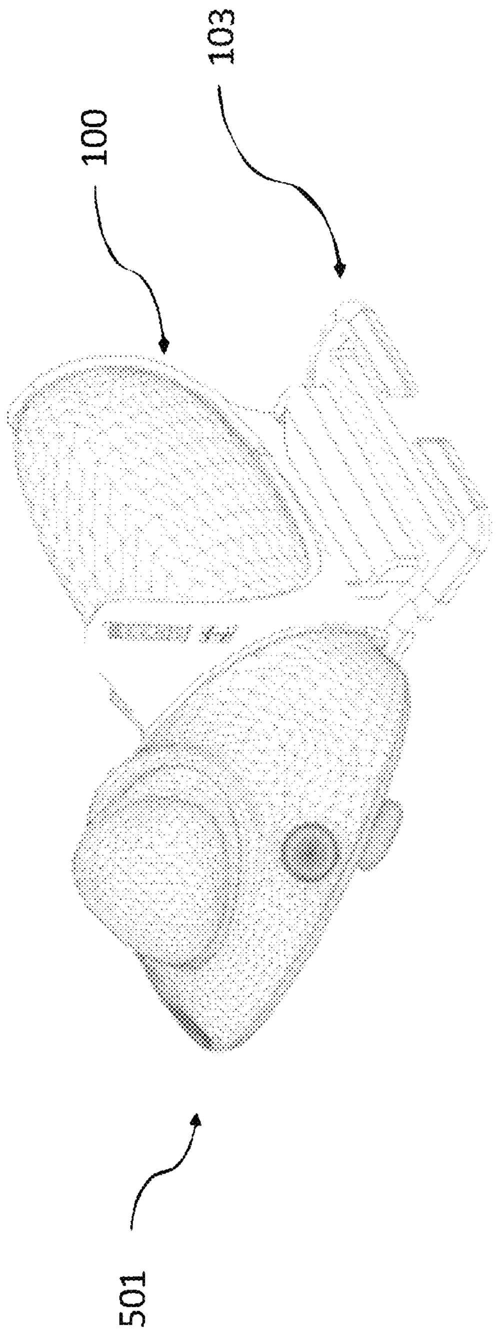
FIG. 10B is an alternative perspective view of the apparatus in a ready to use configuration, according to FIG. 10A.
Figure 10C:
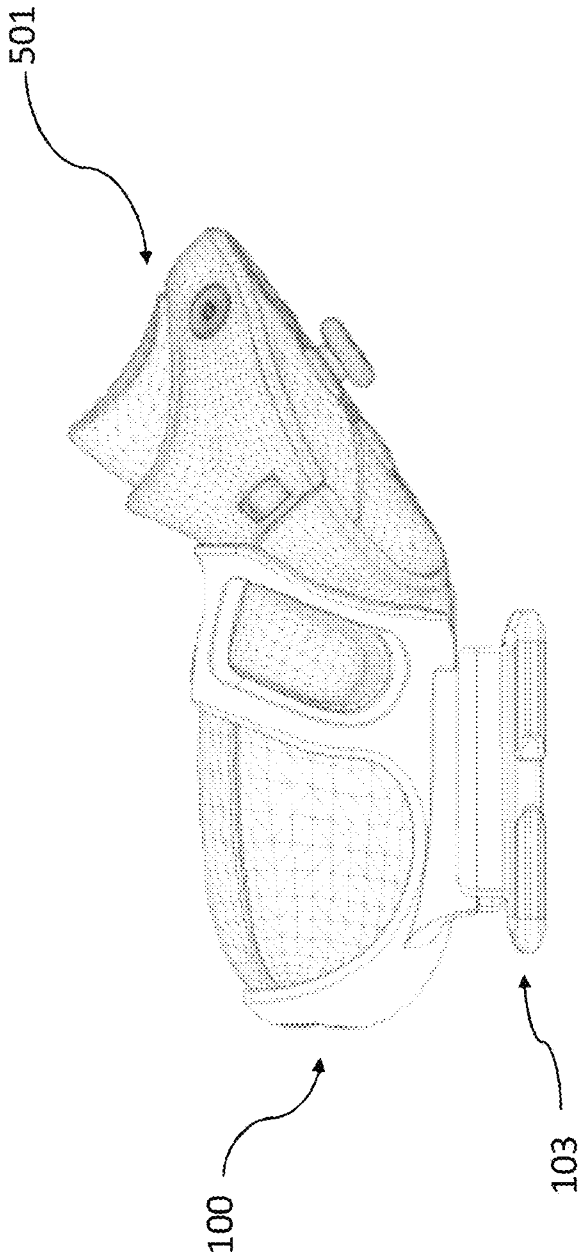
FIG. 10C is a side view of the apparatus in a ready to use configuration, according to FIG. 10A.

FIGS. 9A and 9B show the controller holder guide members (225) in their final position. As shown, the controller holder (100) can continue to be pushed into the mount unit (103) until a mounted position is reached. Further pushing of the controller holder (100) may optionally be prevented by the guide members (225) abutting against the capped ends (317) of the guide member receiving channels (313), whereby the capped ends (317) will resist further pushing of the controller holder (100) into the guide member receiving channels (313). The optional stopper feature of the rear end (229) of the controller holder beams (233) may also abut against the open ends (315) of the guide member receiving channels (313) resisting further pushing of the controller holder (100) into the guide member receiving channels (313). In addition, the optional protrusions (231) on the guide members (225) may engage with the recesses (319) in the mount unit (103) walls (307) which may provide an audible or tactile cue such as a "click" to the user that signifies the maximum push distance of the controller holder (100) has been achieved.

The controller holder (100) can be held in place in the mount unit (103) in a number of ways.

Firstly, the restorative force arising from the resilient deformation of the V-shaped cut-out (221) of the controller holder (100) will cause the guide members (225) attached to the controller holder (100) to push against the walls of the guide member receiving channels (313). The walls (307) in turn will resist the restorative force from resilient deformation, resulting in a resistance to lateral displacement of the controller holder (100).

Secondly, overhang portions (311) of the guide member receiving channels (313) will be in contact with the top edges of the guide members (225). The rigidity of the overhang portions (311) will resist any vertical displacement of the controller holder (100) away from the mount unit (103).

Thirdly, the guide members (225) and stopper ends abutting against the guide member receiving channel's capped ends (317) and/or open ends (315) respectively may resist any further longitudinal displacement of the controller holder (100) in the push direction.

Finally, the protrusions (231) of the guide members (225) engaging with the recesses (319) of the walls (307) of the guide member receiving channels (313) further provides a limited retention function to resist longitudinal displacement in a direction opposite to the direction the controller holder (100) is pushed into the mount unit (103). This limited retention function can be overcome by the user pulling the controller holder (100) in a reverse direction to the push direction such that only a small or moderate force is required to disengage the protrusions (231) from the recesses (319).

The invention claimed is:

1. An apparatus for mounting a controller to a user comprising:
- a controller holder; and
- a mount unit for receiving the controller holder, the mount unit being configured to be attached to the user;
- wherein the controller holder and mount unit are configured to be attached by a resiliently deformable releasable mechanism and the controller holder is held in place at least partially by the restorative force due to the resilient deformation of the releasable mechanism;
- wherein the controller holder further comprises a cut-out for permitting resilient deformation of the controller holder when engaging with the mount unit; and
- wherein the cut-out is configured to permit the controller holder to resiliently deform to receive a controller before the controller holder is inserted into the mount unit and to hold the controller in place within the controller holder when it is inserted into the mount unit.

2. The apparatus according to claim 1 wherein the controller holder further comprises two substantially separated longitudinally extending portions on either side of the cut-out which can be urged towards each other, the portions being joined to each side of a pivot location and the distance between the portions increasing as the distance from the pivot location increases.

3. The apparatus according to claim 2 wherein the pivot location is rounded to decrease stress concentrations.

4. The apparatus according to claim 1 wherein the resiliently deformable releasable mechanism comprises guide members for engaging with respective corresponding guide member receiving channels.

5. The apparatus according to claim 4 wherein the guide member receiving channels each comprise a wall extending from the mount unit for resisting lateral displacement of the guide members.

6. The apparatus according to claim 4 wherein the guide member receiving channels each further comprise an overhang portion for resisting, at least partially, any vertical displacement of the guide members.

7. The apparatus according to claim 4 wherein the guide members are formed of longitudinally extending members.

8. The apparatus according to claim 1 wherein the guide members are on the controller holder and respective corresponding guide member receiving channels are on the mounting unit.

9. The apparatus according to claim 1 wherein the controller holder further comprises a cradle for receiving the controller.

10. An apparatus for mounting a controller to a user comprising:
- a controller holder; and
- a mount unit for receiving the controller holder, the mount unit being configured to be attached to the user;
- wherein the controller holder and mount unit are configured to be attached by a resiliently deformable releasable mechanism and the controller holder is held in place at least partially by the restorative force due to the resilient deformation of the releasable mechanism; and
- wherein the controller holder further comprises a retaining member for, in use, engaging with a control input of a controller and holding the controller within the controller holder.

11. The apparatus according to claim 10 wherein the control input is a pressable button.

12. An apparatus for mounting a controller to a user comprising:
- a controller holder; and
- a mount unit for receiving the controller holder, the mount unit being configured to be attached to the user;
- wherein the controller holder and mount unit are configured to be attached by a resiliently deformable releasable mechanism and the controller holder is held in place at least partially by the restorative force due to the resilient deformation of the releasable mechanism; and
- wherein the controller holder further comprises at least one opening for controller sensors and/or cameras of a controller mounted in the controller holder.

13. An apparatus for mounting a controller to a user comprising:
- a controller holder; and
- a mount unit for receiving the controller holder, the mount unit being configured to be attached to the user;
- wherein the controller holder and mount unit are configured to be attached by a resiliently deformable releasable mechanism and the controller holder is held in place at least partially by the restorative force due to the resilient deformation of the releasable mechanism; and
- wherein the mount unit includes a controller holder channel for slidably receiving the controller holder, wherein the controller holder channel has a first end that is open for receiving the controller holder and a second end towards which the controller holder is slid, and wherein the controller holder channel narrows between the first and the second end.

14. The apparatus according to claim 13 wherein the size of the opening at the first end of the controller holder receiving channel is greater than the width of the portion of the controller holder that is received in the controller holder receiving channel.

15. The apparatus according to claim 1 wherein the controller holder is pushed into the mount unit in a direction from heel to toe, when the mount unit is mounted on a user's foot.

16. The apparatus according claim 15 wherein the controller holder locks into place at a maximum push distance.

17. The apparatus according to claim 1 wherein the resiliently deformable mechanism is configured to be loosened, and the controller holder removed from the mounting unit, by sliding the controller holder in an opposite direction to the direction in which the controller holder is inserted into the mounting unit.

18. The apparatus according to claim 1 further comprising at least one protrusion for engaging with at least one recess to hold the controller holder partially in place once inserted to the final stop position in the mount unit, wherein the at least one protrusion is mounted on the controller holder and the at least one recess is mounted on the mounting unit or vice versa.

19. The apparatus according to claim 1 wherein the mount unit further comprises a mount plate having a generally rounded concave shape.

20. The apparatus according to claim 1 wherein the mount unit is attached to a user's foot.

21. The apparatus according to claim 1 wherein the controller is a virtual reality controller.

22. The apparatus according to claim 1 wherein the mount unit further comprises at least one slot for an attachment strap for a strap that passes around the underneath of a user's foot.

23. The apparatus according to claim 1 further comprising a foot strap that passes around the bottom of a user's foot for attaching the mount unit to the user's foot.

24. The apparatus according to claim 20 further comprising an ankle strap for passing around a user's ankle for securing the strap to the user.

25. The apparatus according to claim 24 wherein the ankle strap is coupled to a strap around a user's foot.

* * * * *